United States Patent Office 3,167,561  
Patented Jan. 26, 1965

3,167,561  
2,5-DIAZABICYCLO-[2,2,1]HEPTANES AND [2,2,2]OCTANES  
Lewis H. Sarett, Princeton, Alexander R. Matzuk, Colonia, and Tsung-Ying Shen, Westfield, N.J., assignors to Merck & Co., Inc., Rahway, N.J., a corporation of New Jersey  
No Drawing. Filed Feb. 5, 1963, Ser. No. 256,240  
9 Claims. (Cl. 260—293)

This invention relates to new heterocyclic bicyclic compounds. More specifically, this invention relates to 2,5-diazabicyclo-[2,2,1]heptanes and 2,5-diazabicyclo-[2,2,2]octanes with or without substituents on the nitrogens. More specifically also, this invention relates to a compound of the formula

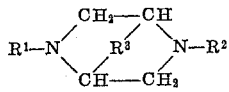

in which $R^1$ and $R^2$ are organic radicals and $R^3$ is an alkylene bridge or less than 3 carbons. More specifically also, this invention relates to a compound of the formula

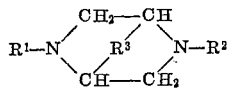

in which $R^1$ and $R^2$ may be hydrogen, alkyl, aryl, substituted aryl, heteroaryl, substituted heteroaryl, aralkyl, substituted aralkyl, substituted alkyl, alkanoyl, substituted alkanoyl, aroyl, heteroaroyl, aralkanoyl, aralkenoyl, carboalkoxy, carbophenoxy, substituted carbophenoxy, acrbobenzyloxy, dialkylcarbamoyl, diarylcarbanoyl, carbalkoxyalkyl, arylsulfonyl, arylthio, nitroso, amino, aroylamino, alkylated amino, aralkylamino, heteroarylalkyl, N-heteroarylsulfonyl, N-heteroarylcarboxy and N-heteroarylaminoalkyl; and $R^3$ is an alkylene bridge of less than 3 carbons and to processes for the preparation of these compounds. More specifically also, this invention relates to bicyclic amides usable to prepare the above compounds.

We have found a new class of bicyclic heterocyclic compounds possessing a variety of utilities depending on the substituent on the nitrogen atoms. We have found unsubstituted bicyclic heterocyclic compounds which are intermediates for other compounds of the class and which also have utility in their own right in various biochemical activities. The N-substituted compounds of this invention as well as the un-substituted compounds may be antihistaminics, antiemetics, antiallergics, tranquilizers, antiparisitics, hypotensives, central nervous system depressants, sedatives, antibiotics, antispasmodics, analgesics, and in some cases central nervous system stimulants and the like. For example, 2[α-(2-chloro-10-phenothiazinyl)propyl] - 5 - hydroxyethyl-2,5-diazabicyclo-[2,2,2]octane shows strong activity as a tranquilizer while the unsubstituted 2,5-diazabicyclo-[2,2,2]octane is active as an anthelmintic as well as usable as an intermediate for the preparation of the N-substituted compounds, as shown in the flow sheet and examples of these specifications. As an anthelmintic, this latter compound is used in a dose of at least 100 mg./kg. orally.

FLOW SHEET A

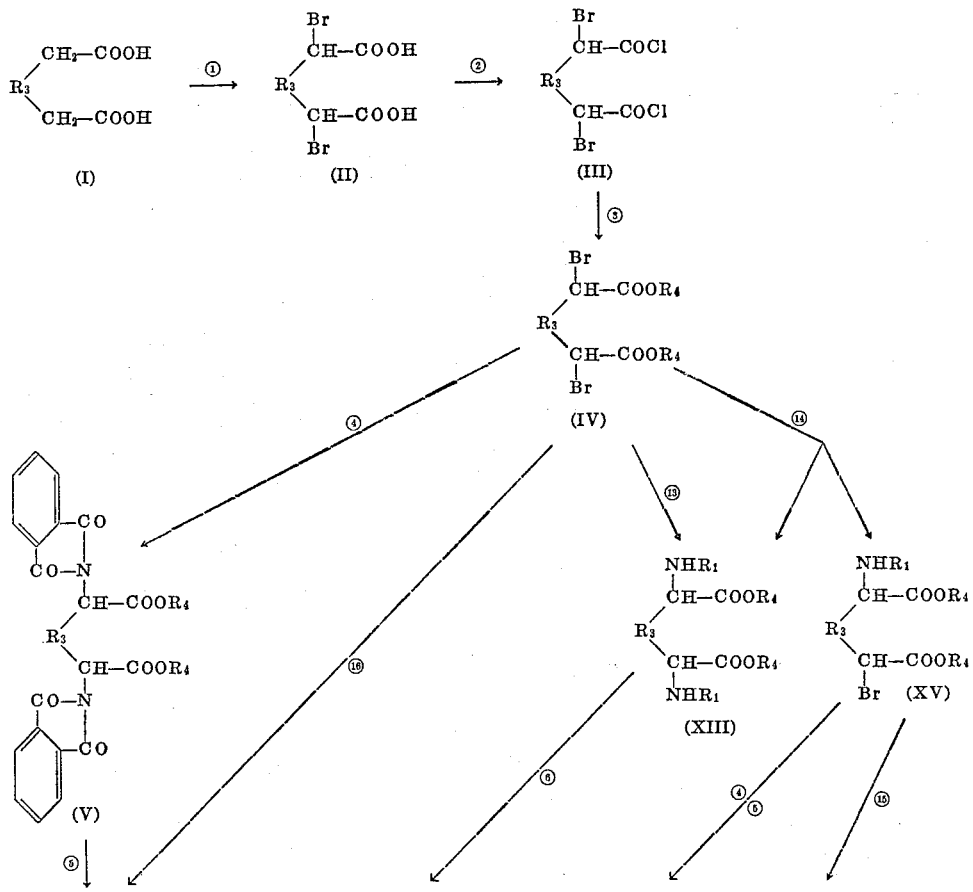

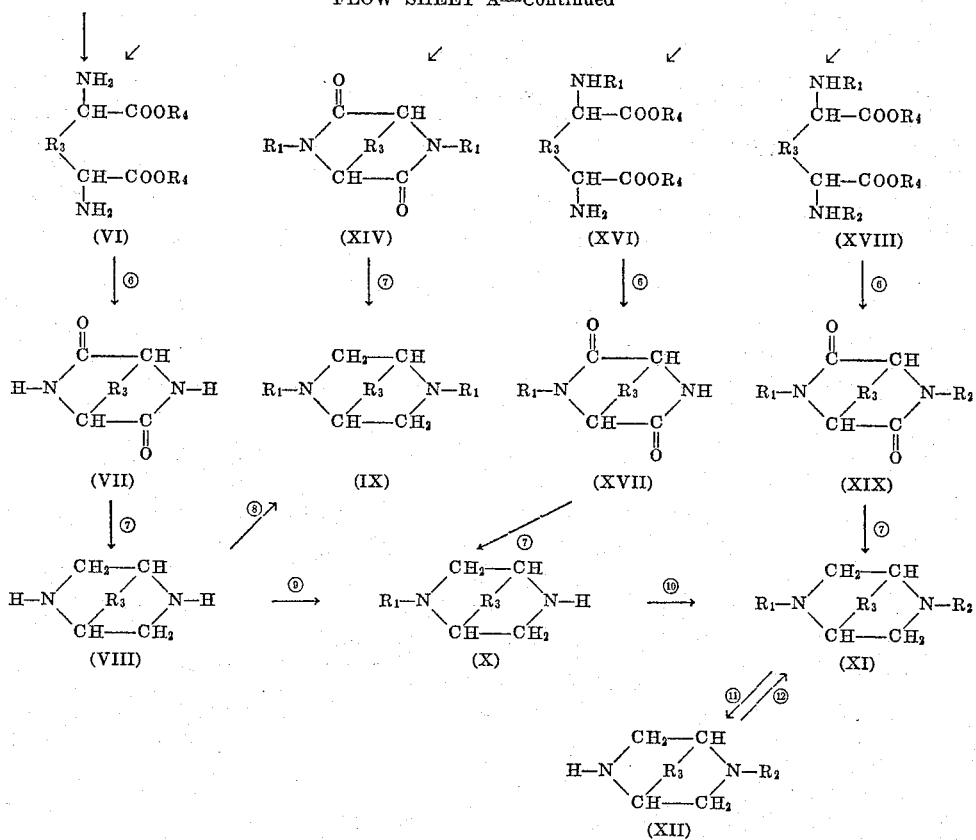
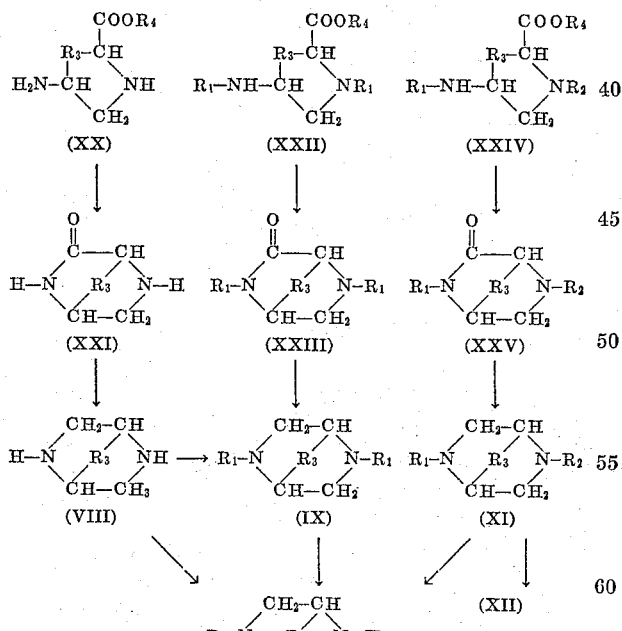

Equivalents:
R₁ and R₂ are as defined in the specifications, except that they are used to indicate groups other than hydrogen and that the groups are different.
R₃ is methylene or ethylene
R₄ is any esterifying group (alkyl, aryl, aralkyl, alkenyl, cycloalkyl, lower alkoxymethyl, cyanomethyl, or substituted derivatives thereof) preferably lower alkyl such as methyl or ethyl.

Reagents:
① $Br_2$ and UV light.
② Excess $SOCl_2$.
③ Add crude product from ② to $R_4OH$.
④ Heat in inert solvent (e.g., DMF) with potassium phthalimide.
⑤ Heat with organic or inorganic base (e.g., hydrazine hydrate) in inert solvent (e.g., $R_4OH$).
⑥ Heat in inert solvent (e.g., $CH_3OH$) containing at least catalytic amount of strong base (e.g., $NaOCH_3$).
⑦ Heat with strong reducing agent for carbonyls (e.g., $LiAlH_4$) in inert solvent (e.g. dioxane).
⑧ Reaction with 2 or more moles of $R_1X$ where X is group easily split off in reaction with amino group, usually halogen but also sulfonate, epoxide, diazides, etc.). Reaction can be run in aqueous alkaline suspension of (VIII) or organic base containing solution of (VIII) in inert solvent.
⑨ Reaction with 1 mole of $R_1X$ in same manner as ⑦, but usually controlled by following pH and titrating.
⑩ Reaction with $R_2X$ in same manner as ⑦.
⑪ Removal of certain $R_1$ groups by special means not affecting the $R_2$ group (e.g., where $R_1$ is acyl and $R_2$ alkyl, saponification).
⑫ Repeat of ⑩ with $R_1X$ where $R_1$ is different from original $R_1$.
⑬ Reaction with excess $R_1NH_2$ in a high boiling solvent (e.g., nitrobenzene) in the presence of Cu powder and an acid binding agent (e.g., $Na_2CO_3$) using pressure when needed to retain the amine in the mixture at the elevated temperature used (150° C. or higher).
⑭ Reaction with 1 mole of $R_1NH_2$ in same manner as ⑬, followed by separation chromatographically, using ether-petroleum ether mixtures to elute from an alumina column.
⑮ Reaction with $R_2NH_2$ in same manner as ⑬.
⑯ Reaction with $NH_3$ in same manner as ⑬, using pressure.

The compounds of this invention are prepared by a number of routes as described in the flow sheet. The most important routes are those shown in Part A of the flow sheet. As can be seen, these depend primarily on the formation of $\alpha,\alpha'$-dibromodibasic carboxylic esters of the general formula shown by Compound IV. These are prepared by taking a dibasic acid and brominating the $\alpha$-carbons and converting the carboxyls through the acid chlorides to ester groups. The bromination is carried out in an inert solvent such as carbon tetrachloride in the presence of a red phosphorous catalyst. The acids used as starting materials are glutaric and adipic acids. After bromination the carboxyls are esterified by reaction with thionyl chloride to form the acid chloride and reaction of the latter with an alcohol to form the ester. This bromo ester is the intermediate from which we have divers synthetic routes start, depending on what compounds are desired. In the most flexible of these, the bromine is replaced by the amino either through the phthalimide or directly with ammonia. The phthalimide reaction is carried out by heating in an inert solvent such as dimethylformamide (hereinafter abbreviated DMF), with potassium phthalimide. The bisphthalimido ester is readily converted by heating with a base such as hydrazine hydrate to the diamino ester. Alternatively, the dibromo ester can be heated under pressure with ammonia, a copper catalyst, in a high-boiling solvent such as nitrobenzene containing an acid-binding agent such as sodium carbonate directly into the diamino ester. The $\alpha,\alpha'$-diamino-diester (Compound VI) is then cyclized to a cyclic bisamide by heating in an inert solvent such as methanol in the presence of at least a catalytic amount of an anhydrous base such as sodium methoxide. The cyclic bisamides (VII) thus produced form one embodiment of this invention usable as an intermediate for preparation of the latter compounds.

The amide carbonyls of the bisamides are reduced by treatment with any strong carbonyl reducing agent such as lithium aluminum hydride in an inert solvent such as dioxane. The resulting diazabicyclo heptane or octane (VIII) is the simple unsubstituted compound of this invention. Substituents on the nitrogen can be introduced in a variety of ways. A symmetrical bis-substituent can be carried out by heating either in aqueous solution or in an organic inert solvent in the presence of an organic base with a reagent readily reacting with an amino nitrogen such as an alkylating agent, an acylating agent and the like. Usually such reactions are carried out by the elimination of a hydrogen halide to form the new bond to the nitrogen, e.g., heating with an excess of an alkyl halide or an acyl halide. However, other special reagents may be used to introduce groups difficult to introduce by the simpler method. Thus, e.g., the method of Beringer described in the Journal of the American Chemistry Society, 75, 2708 (1953) can be used to introduce aryl groups onto the nitrogens. This method involves the reaction of a diaryl iodonium bromide with a secondary amine. The method of Sus et al. in Annalen, 598, 123 (1956) also can be used. In general, the methods of introducing the various substituents on the nitrogen are illustrated in the examples and depend to a large extent on the type of substituent which is to be introduced.

Alternatively, one can introduce substituents directly from the dibromo ester as shown in the flow sheet by reaction with the proper amine or amide in a high-boiling solvent such as nitrobenzene and in the presence of a copper catalyst and an acid-binding agent such as sodium carbonate. This method, although somewhat less general than the other route, is more direct in the case of some substituents and in the case of those substituents which are difficult to introduce later, may well be the only way to reach the final product. This introduction of an amino nitrogen into the diester may need the use of pressure when the amine boils too low for the temperature necessary for the reaction, at 150° C. or higher.

The use of an excess of amine to be introduced will give the symmetrical di-substituted amino ester, which upon ring closure, gives a symmetrically N-substituted bicyclic amide. Reduction of the amide carbonyls as before yields the symmetrically substituted diazabicycloheptane or octane. When the usage of the amine in the reaction with the bromo-ester is approximately mole for mole, a mixture of di-substituted and mono-substituted amino ester is obtained, which can be separated chromatographically. The $\alpha$-substituted amino-$\alpha'$-bromo diester (XV) can then be reacted either with ammonia or with potassium phthalimide to replace the bromine with an unsubstituted amino group.

Alternatively, reaction with another mole of a different amine will replace the bromo with a different substituted amino group. Ring closure of either of these gives the correspondingly substituted bicyclic amide which can then be reduced as before to the diazabicyclo heptane or octane having only one nitrogen bearing a substituent, or having two nitrogens bearing different substituents.

These latter compounds are also preparable directly from the unsubstituted diazabicyclo heptane or octane by the sequence shown in the flow sheet in reactions ⑨ and ⑩. Mono substitution is achieved by reaction of one mole of the reagent with the unsubstituted diazabicyclo alkane while following the reaction with a pH indicator since the basicity of the amino nitrogen is changed by substitution. Usually, this is done by an acylating reagent to introduce an acyl group. A further substituent can then be introduced as shown by reaction ⑩ in the flow sheet and the acyl group can be removed as shown in reaction ⑪ to get another mono substituted compound which otherwise might be much more difficult to obtain.

The acrylation of the diazabicyclo compound with an acyl halide is readily followed with a pH meter and the effect is to block one nitrogen and permit easy substitution by any desired reagent or substituting group on the other nitrogen. The acyl group can then be removed to get a desired mono substituted compound and if desired a second and differing substituent can then be put on the unblocked nitrogen as shown in reaction ⑦.

An alternative method of preparing these compounds is shown in Part B of the flow sheet. This method starts with a heterocyclic amino carboxylic ester with or without substituents on the nitrogens. Various of these compounds are readily available in the literature and where they are available they form a simple and easy way to get to the compounds of this invention. These amino heterocyclic esters illustrated by the compounds of Formulae XX, XXII, XXIV, XXVI, and XXVIII in the flow sheet all are ring closed by the same procedure used before for the bisamide into a bicyclic mono amide having another hetero atom and this can then be reduced to form the desired diazabicyclo heptane or octane.

The substituents $R^1$ and $R^2$ which can thus be put upon the nitrogen can be nitroso, amino or substituted amino, or any organic radical which is normally linkable to a basic nitrogen. Thus, e.g., it may, in addition to hydrogen and the nitroso and amino groups, be acyl, such as benzoyl, acetyl, chloracetyl, dichloroacetyl, propionyl, cinnamoyl, thenoyl, furoyl, nitrofuroyl, nicotinoyl, pyrazinoyl, thiazolecarbonyl, phenylacetyl and the like. Also, it may be carboalkoxy, carbophenoxy, carbonitrophenoxy, carboethoxy, carbobenzyloxy and the like. It may also be alkyl such as ethyl, methyl, propyl, butyl, cyclohexyl and the like or substituted alkyl such as $\beta,\beta,\beta$-trifluoroethyl, carbethoxyethyl, cyanoethyl, hydroxyethyl, phenethyl, aminoethyl, acetylaminoethyl, dimethylaminoethyl or N-chlorophenothiazenyl propyl. It may be an aryl group such as phenyl, tolyl or a substituted aryl group such as hydroxyphenyl, aminophenyl, acetylaminophenyl, dimethylaminophenyl and the like. It may also be an aralkyl group such as a benzyl, phenethyl, phenylethylmethyl and the like or aralkenyl such as cinnamyl. It may also be a heterocyclic aroyl such as N-morpholinylsulfonyl, N-pyrrolidinylsulfonyl and the corresponding carboxy compounds and the like. It may also be an arylthio such as tolylthio, phenylthio or arylthioalkyl such as benzylthiomethyl. Thus, it can be seen that there is a wide range of substituents which may be placed on the nitrogen in the compounds of our invention.

Our invention can be illustrated by the following examples:

EXAMPLE 1

*Dimethyl α,α'-dibromo adipate*

A mixture of 500 g. of adipic acid and 1 kg. of thionyl chloride is heated overnight on a steam bath. The excess thionyl chloride is then removed by distillation under reduced pressure. The diacid chloride is then heated on a steam bath with stirring and 402 ml. (1.25 kg.) of bromine is added dropwise at a rate such that no bromine is lost to the condenser. A photoflood lamp is used to accelerate the reaction. After complete addition of the bromine, the reaction mixture is heated overnight on a steam bath. It is then added in a thin stream to 690 ml. of methanol, with stirring. The mixture is cooled in an ice bath and if necessary seeded. The crystals are obtained by cooling an aliquot in dry ice. The crystallized material is filtered and washed with cold methanol. After several weeks, more product crystallizes from the filtrate and this also is filtered and washed with cold methanol. It can be recrystallized from boiling methanol. The product melts at 74–76° C.

EXAMPLE 2

*Dimethyl α,α'-diphthalimido adipate*

A mixture of 69 g. of dimethyl-α,α'-dibromoadipate (prepared in Example 1), 87 g. of potassium phthalimide and 260 ml. of dimethylformamide is heated on a steam bath to about 90° C. with occasional agitation for about an hour. The mixture is then allowed to cool and is diluted with 300 ml. chloroform. It is then poured into 1200 ml. of water and the chloroform layer separated. The aqueous layer is extracted twice with 100 ml. chloroform and the combined extracts are washed with 200 ml. of cold 0.1 N sodium hydroxide solution, followed by 200 ml. water and then dried over sodium sulfate. The chloroform is removed under reduced pressure to the point of crystallization. Three hundred (300 ml.) of ether is then added and the mixture is agitated. Rapid crystallization occurs and the mixture is allowed to stand until the process is complete. It is then filtered and the product is washed with ether and air dried. A yield of 87.3 g. (91%) of bisphthalimido adipic acid dimethyl ester is obtained; M.P. 162–190°. Upon recrystallization from boiling ethyl acetate, this product melted at 197–204°.

A second crop of product is obtained by concentrating in vacuo to the point of crystallization. Further crops can similarly be obtained by further concentration of the filtrate.

EXAMPLE 3

*α,α'-Diaminoadipic acid and dimethyl α,α'-diaminoadipate*

A. A mixture of 52.5 g. of dimethyl-α,α'-diphthalimido adipate, 565 ml. of methanol and 13.5 ml. of 85% aqueous hydrazine hydrate solution is refluxed for one hour. The mixture is then cooled and 283 ml. of water is added. The methanol is then removed in vacuo and the residual aqueous suspension is treated with 283 ml. concentrated hydrochloric acid and refluxed for one hour. The reaction mixture is then cooled overnight. The crystallized phthalhydrazide is removed by filtration and the filtrate concentrated in vacuo to remove the hydrochloric acid. The residue is dissolved in 565 ml. of water. The solution is filtered and neutralized with 2N sodium hydroxide. The mixture is then cooled in a refrigerator and the crystallized product is isolated by filtration, washed with cold water and air dried to yield 12.5 g. (63%) of α,α'-diamino adipic acid. Melting point, with decomposition, 303° C.

B. A mixture of 10.5 gms. of α,α'-diaminoadipic acid in 500 ml. of methanol is saturated with anhydrous hydrogen chloride and refluxed overnight. The solution is concentrated in vacuo to a small volume and excess ether is added. The mixture is allowed to stand at room temperature overnight. The white precipitate is filtered, washed with ether and dried in vacuo to yield 16.9 gms. of dimethyl α,α'-diaminoadipate dihydrochloride. Melting point, with decomposition 201–203° C.

EXAMPLE 4

*2,5-diaza-3,6-dioxobicyclo-[2,2,2]octane*

10 g. of dimethyl α,α'-diamino adipate dihydrochloride is suspended in 1000 ml. of methanol and 3.9 g. of sodium methoxide is added. The mixture is refluxed for 8 hours and then allowed to stand at room temperature for several days. The solvent is evaporated under reduced pressure and the residual white product is extracted with excess boiling chloroform in a continuous extraction. The chloroform extract is then evaporated to dryness. The residue is recrystallized from boiling methanol. The product sublimes and melts at 727–273° C. *Analyis.*—Calcd. for $C_6H_8N_2O_2$: C, 51.42; H, 5.75; N, 19.99. Found: C, 51.22; H, 5.99; N, 220.13.

EXAMPLE 5

*2,5-diazabicyclo-[2,2,2]octane*

A mixture of 5 g. of the product of Example 4, 2 g. of lithium aluminum hydride and 50 g. of dry dioxane is stirred and refluxed for 46 hours. The mixture is then cooled and excess ethyl acetate is added. The insoluble material is filtered and washed with excess boiling ethyl acetate. The filtrates are combined and evaporated to dryness at atmospheric pressure. The residual product is the desired diazabicyclo octane containing some impurities. It is usable directly for acylation.

The crude product is distilled in vacuo and the portion boiling at 90–91° C. at 15 mm. is collected in a flask immersed in a Dry Ice bath. This distillate is dissolved in dry ether and treated with dry hydrogen chloride. The white precipitate is filtered, washed with ether and dissolved in boiling methanol. The methanol solution is concentrated in vacuo to the start of crystallization, diluted with excess ethyl acetate and cooled. The crystalline dihydrochloride is filtered, washed with ether and dried in vacuo. It gradually decomposes without melting upon heating at 335° C. Calcd. for $C_6H_{14}Cl_2N_2$: C, 38.93; H, 7.62; N, 15.14; Cl, 38.31. Found: C, 38.96; H, 7.50; N, 15.15; Cl, 37.89 (total), 38.03 (ionic).

EXAMPLE 6

*2,5-diazabicyclo-[2,2,1]heptane*

The procedure of Example 1 is followed using an equivalent quantity of glutaric acid and the resultant products are carried through the procedures of Examples 2, 3, 4, and 5 to produce 2,5-diazabicyclo-[2,2,1] heptane and its dihydrochloride.

EXAMPLE 7

*2,5-dibenzoyl-2,5-diazabicyclo-[2,2,2]octane*

A. Two parts of 2,5-diazabicyclo-[2,2,2]octane dihydrochloride and 25 parts 10% sodium hydroxide solution are stirred and cooled while 6 parts benzoyl chloride is slowly added. The mixture is allowed to come to room temperature. The precipitated solid is filtered, washed with 2.5 N hydrochloric acid, water, saturated sodium bicarbonate solution, water and then dried. Recrystallization from benzene-Skellysolve B gives the 2,5-dibenzoyl-2,5-diazabicyclo-[2,2,2]octane melting at 181–183°.

B. A mixture of two parts of 2,5-diazabicyclo-[2,2,2] octane in 25 parts dried pyridine is cooled and stirred while 6 parts benzoyl chloride is slowly added dropwise. The mixture is allowed to stir in cold about 1 hour and then at room temperature overnight. The reaction mixture is poured into excess water with stirring and in a short while a solid forms. The solid is filtered and washed with cold 2.5 N HCl, water, saturated sodium bicarbonate and finally with water. After air drying and recrystallization from benzene-Skellysolve B the 2,5-dibenzoyl-2,5-diazabicyclo-[2,2,2]octane is obtained.

Similarly, when acetyl chloride, dichloroacetyl chloride, β-bromopropionyl chloride, cinnamoyl chloride, phenylchloroformate, p-nitrophenylchloroformate, ethylchloroformate, diethylaminocarbonyl chloride, diphenylaminocarbonyl chloride, 2-thenoyl chloride, 2-furoyl chloride, 5-nitro-2-furoyl chloride, nicotinoyl chloride, pyrazinoyl chloride, 4-thiazolcarbonyl chloride, phenylacetylchloride, α-ethylphenylacetyl chloride, β-naphthoyl chloride, 3,4,5-trimethoxybenzoyl chloride, 2-methoxybenzoyl chloride, and acetylsalicyloyl chloride are substituted in equivalent quantities for the benzoyl chloride in the above procedures, there are obtained:

2,5-diacetyl-2,4-diazabicyclo-[2,2,2]octane,
2,5-bis(dichloroacetyl)-2,5-diazabicyclo-[2,2,2]octane,
2,5-bis(β - bromopropionyl) - 2,5 - diazabicyclo - [2,2,2]octane,
2,5-dicinnamoy-2,5-diazabicyclo-[2,2,2]octane,
Diphenyl-2,5-diazabicyclo-[2,2,2]octane-2,5 - dicarboxylate,
Bis(p-nitrophenyl)-2,5 - diazabicyclo - [2,2,2]octane - 2,5-dicarboxylate,
Diethyl-2,5-diazabicyclo-[2,2,2]octane-2,5-dicarboxylate,
2,5-bis(diethylcarbamoyl)-2,5-diazabicyclo-[2,2,2]octane,
2,5-bis(diphenylcarbamoyl)-2,5-diazabicyclo-[2,2,2]octane,
2,5-bis(2-thenoyl)-2,5-diazabicyclo-[2,2,2]octane,
2,5-bis(2-furoyl)-2,5-diazabicyclo-[2,2,2]octane,
2,5-bis(5-nitro-2-furoyl)-2,5-diazabicyclo-[2,2,2]octane,
2,5-dinicotinoyl-2,5-diazabicyclo-[2,2,2]octane,
2,5-dipyrazinoyl-2,5-diazabicyclo-[2,2,2]octane,
2,5-bis(4-thiazole carbonyl)-2,5-diazabicyclo-[2,2,2]octane,
2,5-bis(phenylacetyl)-2,5-diazabicyclo-[2,2,2]octane,
2,5-bis(α-ethyl-phenylacetyl)-2,5-diazabicyclo-[2,2,2]octane,
2,5-bis(β-naphthoyl)-
2,5-bis(3,4,5-trimethoxybenzoyl)-
2,5-bis(acetyl salicyloyl)-
2,5-bis(o-methoxybenzoyl)-

EXAMPLE 8

*2-benzoyl-2,5-diazabicyclo-[2,2,2]octane*

Four and eight-tenth grams of 2,5-diazabicyclo-[2,2,2]octane dihydrochloride is dissolved in 48 ml. water. Using a pH meter, with stirring, 2.5 N hydrochloric acid is added dropwise to bring the pH to 3, after which 48 ml. of acetone is added. Three ml. of benzoyl chloride is then added a few drops at a time. As the pH starts to drop towards 2.5, a solution of sodium acetate (40 gms./100 ml. water) is added to bring the pH of the mixture back to 3. The next batch of benzoyl chloride is not added until the pH remains constant. During the entire addition, the pH is kept 3.1–2.5. After complete addition, stirring is continued at pH of 3. The small amount of precipitate, which is the dibenzoyl derivative, is filtered. The filtrate is saturated with potassium carbonate and extracted with excess chloroform. The chloroform extract is dried and evaporated to dryness. The residue is triturated with ether and the slurry is filtered to give 3.5 gms. of crystalline 2-benzoyl-2,5-diazabicyclo-[2,2,2]octane, melting at 109–111° C..

When the various acid chlorides used in Example 7 are used in place of the benzoyl chloride in the above procedure, the corresponding mono-acyldiazabicyclo octane is obtained.

EXAMPLE 9

*Dibenzyl - 2,5 - diazabicyclo - [2,2,2]octane - 2,5 - dicarboxylate and benzyl-2,5-diazabicyclo - [2,2,2]octane-2-carboxylate*

The procedure of Example 7 is followed using carbobenzyloxy chloride in equivalent quantities in place of benzoyl chloride to produce dibenzyl-2,5-diazabicyclo-[2,2,2]octane-2,5-dicarboxylate.

The procedure of Example 8 is followed similarly using carbobenzyloxy chloride in equivalent quantities in place of benzoyl chloride to produce benzyl-2,5-diazabicyclo-[2,2,2]octane-2-carboxylate.

EXAMPLE 10

*2,5-dimethyl-2,5-diazabicyclo-[2,2,2]octane*

One mole of 2,5-diazabicyclo-[2,2,2]octane and two moles of methyl iodide in 40 parts methanol are heated for one hour on the steam bath under an efficient condenser. A precipitate of 2,5-dimethyl-2,5-diazabicyclo-[2,2,2]octane dihydroiodide soon precipitates. The reaction mixture is cooled and filtered and the precipitate is washed with cold methanol. The salt is dissolved in a minimum amount of water, saturated with potassium carbonate and extracted with excess chloroform. The chloroform extract is dried and evaporated to dryness to yield the crude product, which is distilled in vacuo to give a pure product.

EXAMPLE 11

*2,5-diphenyl-2,5-diazabicyclo-[2,2,2]octane*

The procedure of Hager, Org. Syntheses, Coll. vol. I, page 544 (1942) is followed using 2,5-diazabicyclo-[2,2,2]octane in half the equivalent quantity for the diphenylamine. The produce thus obtained is 2,5-diphenyl-2,5-diazabicyclo-[2,2,2]octane.

EXAMPLE 12

*2,5-bis-p-hydroxyphenyl-2,5-diazabicyclo-[2,2,2]octane*

One-tenth of a mole of 2,5-diazabicyclo-[2,2,2]octane is dissolved in 300 cc. of dimethylformamide and two-tenths mole (24 g.) of 1,4-benzoquinone diazide is added. The mixture is irradiated by an ultraviolet lamp in the manner as described by O. Sus et al. in Ann. 598, 123–38 (1956), until the reaction is substantially complete. The solvent is removed under reduced pressure and the residue is chromatographed on 900 g. of silica gel using a mixture of ether-ethyl acetate as eluent to yield 2,5-bis-p-hydroxyphenyl-2,5-diazabicyclo-[2,2,2]octane.

When an equivalent quantity of acetamino quinone diazide, substituted in the above procedure for 1,4-benzoquinone diazide, there is obtained 2,5-bis(p-acetaminophenyl)-2,5-diazabicyclo-[2,2,2]octane. This product is heated with 5 N sodium hydroxide in 50% aqueous ethanol at reflux until hydrolysis is complete. The mixture is concentrated in vacuo to one half volume, saturated with potassium carbonate and then extracted with ether. Evaporation of the ether solution gives 2,5-bis(p-aminophenyl)-2,5-diazabicyclo-[2,2,2]octane.

EXAMPLE 13

*2,5-bis(p-dimethylaminophenyl)-2,5-diazabicyclo-[2,2,2]octane*

Using the reductive alkylation procedure of Woodruff et al., J.A.C.S. 62, 924 (1940) the treatment of 0.1 mole of 2,5-bis(p-aminophenyl)-2,5-diazabicyclo-[2,2,2]octane and 0.3 mole of formaldehyde gives the 2,5-(p-dimethylaminophenyl)-2,5-diazabicyclo-[2,2,2]octane after fractionation of the residual oil.

EXAMPLE 14

*2,5-bis-benzyl-2,5-diazabicyclo-[2,2,2]octane*

A. One part of 2,5-dibenzoyl-2,5-diazabicyclo-[2,2,2]octane, suspended in 25 parts freshly distilled dry tetrahydrofuran, is added slowly to a stirred suspension of 1 part lithium aluminum hydride in 100 parts of tetrahydrofuran. After addition is complete, the mixture is refluxed overnight. It is then cooled in ice and 5 parts water is added dropwise with stirring. The mixture is allowed to come to room temperature over 2 hours and filtered. The solids are washed with ether. The washings are combined with original filtrate and the whole is taken to dryness in vacuo. The residue is dissolved in a minimum amount of methanol. The solution is saturated with dry hydrogen chloride and diluted with excess dry ether. The white solid which precipitates is filtered, after it has been allowed to stand overnight. The precipitate is washed with ether and dried in vacuo at room temperature. The dihydrochloride of the product solvates with 1 mole of water, melting slowly to 175° C.

B. The identical product is obtained by adding 2 moles of benzyl chloride to 1 mole 2,5-diazabicyclo[2,2,2]octane in 500 parts ethanol and allowing the mixture to stand at room temperature for several days. Evaporation of the reaction mixture gives a crude solid which is dissolved in a minimum amount of water, saturated with potassium carbonate and extracted with excess chloroform. Evaporation of the dried chloroform and subsequent distillation of the residue gives the desired product in a pure state.

EXAMPLE 15

*2,5-bis-carbethoxymethyl-2,5-diazabicyclo-[2,2,2]octane*

The procedure of Adelson and Pollard, J.A.C.S. 57, 1280 (1935) is followed using 2,5-diazabicyclo-[2,2,2]octane. The process consists of reaction with ethyl chloracetate in ethanol in the presence of sodium carbonate. The product is purified by distillation in vacuo.

When the above procedure is followed, substituting an equivalent quantity of chloracetonitrile for the chloracetate, there is obtained 2,5-bis-cyanomethyl-2,5-diazabicyclo-[2,2,2]octane.

EXAMPLE 16

*2,5-bis-β-cyanoethyl-2,5-diazabicyclo[2,2,2]octane*

A well-mixed solution of 0.3 mole of 2,5-diazabicyclo-[2,2,2]octane and 0.6 mole of acrylonitrile is warmed to 50°. The mixture is then allowed to stand overnight, cooling to room temperature. The product is purified by distillation of the crude residue to obtain 2,5-bis-β-cyanoethyl-2,5-diazabicyclo-[2,2,2]octane.

EXAMPLE 17

*2,5-bis-β-hydroxyethyl-2,5-diazabicyclo-[2,2,2]octane*

A solution of one part of 2,5-diazabicyclo-[2,2,2]octane in 25 parts of cold methanol is treated with an excess of ethyleneoxide. The mixture is then allowed to stand in the cold for at least one day, followed by at least another day at room temperature. The solvent is removed by distillation under reduced pressure and the crude residue is distilled in vacuo to yield 2,5-bis-β-hydroxyethyl-2,5-diazabicyclo-[2,2,2]octane.

EXAMPLE 18

*2,5-bis-β-aminoethyl-2,5-diazabicyclo-[2,2,2]octane*

A mixture of one part of the 2,5-bis-cyanomethyl-2,5-diazabicyclo-[2,2,2]octane produced in Example 14 and one part of lithium aluminum hydride in freshly distilled tetrahydrofuran is heated gently overnight with agitation under an atmosphere of nitrogen. Eight parts of cold water and then three parts of 2.5 N sodium hydroxide solution are added, with stirring, to the cooled reaction mixture. After about one hour the mixture is filtered and the solids washed with ether. The filtrates are combined, dried over potassium carbonate, and evaporated to a liquid residue. The residue is chromatographed on 20 parts of alumina using a mixture of ether-methanol as eluent.

EXAMPLE 19

*2,5-bis-β-acetylaminoethyl-2,5-diazabicyclo-[2,2,2]octane*

A solution of 0.01 mole of 2,5-bis-(β-aminomethyl)-2,5-diazabicyclo-[2,2,2]octane in 25 ml. dry pyridine is cooled and stirred, while 0.02 mole of acetyl chloride is added dropwise. After complete addition the stirred reaction mixture is allowed to come to room temperature overnight. The mixture is poured into an ice-water mixture with stirring. The precipitate is separated and washed with water. Recrystallization from benzene-Skellysolve B gives a pure product.

EXAMPLE 20

*2,5-bis-dimethylaminoethyl-2,5-diazabicyclo-[2,2,2]octane*

A mixture of 0.067 mole of 2,5-diazabicyclo-[2,2,2]octane, 0.14 mole of β-dimethylaminoethyl chloride and 26 g. of powdered potassium hydroxide in 150 ml. of acetone are refluxed with stirring for 2.5 hours. The reaction mixture is then filtered and the solid product is washed with acetone. The filtrate is dried over potassium hydroxide, filtered, and then evaporated to dryness. The residue is purified by absorption on alkaline alumina and elution with mixtures of petroleum-ether and ether.

EXAMPLE 21

*2,5-bis-(1,4-benzodioxane-2-yl-methyl-2,5-diazabicyclo-[2,2,2]octane*

A mixture of 56 g. of 2,5-diazabicyclo-[2,2,2]octane, 185 g. of chloromethyl benzodioxane and 40 g. of sodium hydroxide in 125 ml. of water is refluxed for 96 hours and then cooled. The separated product is collected and washed with water followed by methanol and dried. The product can be recrystallized from a mixture of chloroform and methanol to give 2,5-bis-(1,4-benzodioxane-2-yl-methyl-2,5-diazabicyclo[2,2,2]octane.

EXAMPLE 22

*2,5-bis-p-dimethylamino benzenesulfonyl-2,5-diazabicyclo-[2,2,2]octane*

A mixture of 0.1 mole of 2,5-diazabicyclo-[2,2,2]octane, 0.2 mole of p-N,N-dimethylaminobenzenesulfonyl chloride and 50 ml. of pyridine is stirred and cooled until reaction is substantially complete. The mixture is poured into 500 ml. of iced water and extracted with ether. The ether solution is washed with water, dilute hydrochloric acid, saturated sodium bicarbonate, water successively and then dried over sodium sulfate. Evaporation of the solvent and recrystallization from ethanol gives 2,5-bis-(p-N,N-dimethylaminobenzenesulfonyl)-2,5-diazabicyclo-[2,2,2]octane.

EXAMPLE 23

*2,5-bis-p-tolylthio-2,5-diazabicyclo-[2,2,2]octane*

One adds to a solution of 11.8 g. of 2,5-diazabicyclo-[2,2,2]octane in 100 ml. of absolute ether, an ether solution of 15 g. of p-tolyl sulfenyl chloride, dropwise, with cooling. The separated hydrochloride of the excess diazabicyclo octane is filtered and the filtrate is evaporated under reduced pressure. The crude product is recrystallized from hexane. It is 2,5-bis-p-tolylthio-2,5-diazabicyclo-[2,2,2]octane.

EXAMPLE 24

*2-benzoyl-5-hydroxyethyl-2,5-diazabicyclo-[2,2,2]octane*

Five parts of 2-benzoyl-2,5-diazabicyclo-[2,2,2]octane is dissolved in 50 parts methanol and cooled. A solution of 5 parts ethylene oxide in 50 parts cold methanol is added. The mixture is allowed to stand in an ice bath all day and then come to room temperature overnight. The solvent is removed on a steam bath at atmospheric pressure to give 6.4 parts crude product. Purification is achieved by chromatography on a silica gel column (300 parts) using a mixture of ether-ethyl acetate as eluent.

EXAMPLE 25

*2-hydroxyethyl-2,5-diazabicyclo-[2,2,2]octane*

A mixture of 6.4 parts of 2-benzoyl-5-(β-hydroxyethyl)-2,5-diazabicyclo-[2,2,2]octane and 100 parts 2.5 N sodium hydroxide solution is refluxed overnight. The reaction mixture is then saturated with potassium carbonate and extracted with excess chloroform. The chloroform extract is dried and evaporated to dryness in vacuo to give 3.9 parts of 2-hydroxyethyl-2,5-diazabicyclo-[2,2,2]octane.

EXAMPLE 26

*2-benzoyl-5-methyl-2,5-diazabicyclo-[2,2,2]octane*

The procedure of Example 10 if followed using one-half the quantity of methyl iodide and an equivalent quantity of 2-benzoyl-2,5-diazabicyclo-[2,2,2]octane in place of the reactants used therein. The product obtained is 2-benzoyl-5-methyl-2,5-diazabicyclo-[2,2,2]octane.

EXAMPLE 27

*2-methyl-2,5-diazabicyclo-[2,2,2]octane*

The procedure of Example 25 is followed using an equivalent quantity of the product of Example 26 in place of the 2-benzoyl-5-β-hydroxyethyl-diazabicyclo octane used in that example. There is thus obtained 2-methyl-2,5-diazabicyclo-[2,2,2]octane.

EXAMPLE 28

*2-(N-morpholinyl-sulfonyl)-2,5-diazabicyclo-[2,2,2] octane-5-benzyl carboxylate*

The procedure of Example 7 is followed using as the reactants benzyl - 2,5-diazabicyclo-[2,2,2]octane-2-carboxylate prepared in Example 9 and 4-morpholinyl sulfonylchloride. The product obtained is 2-(N-morpholinyl-sulfonyl)-2,5-diazabicyclo-[2,2,2]octane-5-benzyl carboxylate.

When the same procedure is followed using 1-pyrrolidinosulfonyl chloride in equivalent quantities, one obtains benzyl-2,5-diazabicyclo-[2,2,2]octane-5-(1-pyrrolidinosulfonyl)-2-carboxylate.

Also, using the same procedure, but substituting an equivalent quantity of 4-morpholinocarbonyl chloride and benzyl-2,5-diazabicyclo-[2,2,2]octane-2-carboxylate there is obtained the benzyl-2,5-diazabicyclo-[2,2,2]octane-5-(4-morpholinocarbonyl)-2-carboxylate.

Also, again using the same procedure, but substituting an equivalent quantity of 1-piperidinocarbonyl chloride instead of 4-morpholinocarbonyl chloride, there is obtained the benzyl-2,5-diazabicyclo-[2,2,2]octane-5-(1-piperidinocarbonyl)-2-carboxylate.

EXAMPLE 29

*2-(4-morpholinosulfonyl)-2,5-diazabicyclo-[2,2,2]octane*

The product of Example 28 is hydrogenated in an alcoholic solution of 10% palladium charcoal or over 25% palladium on barium sulfate. The result is the removal of the carbobenzyloxy group to form 2-(4-morpholinosulfonyl)-2,5-diazabicyclo-[2,2,2]octane.

Similarly, when benzyl-2,5-diazabicyclo-[2,2,2]octane 5-(4-morpholinocarbonyl)-2-carboxylate is similarly treated, the product obtained is 2-(4-morpholino-carbonyl)-2,5-diazabicyclo-[2,2,2]octane.

EXAMPLE 30

A mixture of 45 g. of diphenyl-iodonium bromide with 50 g. of 2-benzoyl-2,5-diazabicyclo-[2,2,2]octane and 250 ml. of water is refluxed until the reaction is substantially complete. The reaction mixture is cooled and extracted with ether. The extract is dried over sodium sulfate and yields 2-benzoyl-5-phenyl-2,5-diazabicyclo-[2,2,2]octane.

When the above procedure is followed using an equivalent quantity of 4-nitro-diphenyl-iodonium bromide, one obtains 2-benzoyl-5-(p-nitrophenyl)-2,5-diazabicyclo-[2,2,2]octane. When this product is reduced at temperatures between ambient and 50° C. in ethanol solution by hydrogenation over 5% palladium charcoal, there is obtained 2-benzoyl-5-(p-aminophenyl)-2,5-diazabicyclo-[2,2,2]octane.

EXAMPLE 31

*2-phenyl-2,5-diazabicyclo-[2,2,2]octane*

The procedure of Example 25 is followed using an equivalent quantity of the product of Example 30 in place of the mono-benzoyl compound used in that example. The product thus obtained is 2-phenyl-2,5-diazabicyclo-[2,2,2]octane.

EXAMPLE 32

*Benzyl-5-(p-hydroxyphenyl)-2,5-diazabicyclo-[2,2,2] octane-2-carboxylate*

The procedure of Example 13 is followed using one mole of benzyl-2,5-diazabicyclo-[2,2,2]octane-2-carboxylate and one mole of 1,4-benzoquinonediazide to yield benzyl-5-(p - hydroxyphenyl) - 2,5 - diazabicyclo - [2,2,2] octane-2-carboxylate.

When the procedure of Example 29 is followed on this product, one obtains, by the removal of the carbobenzyloxy group, 2-(p-hydroxyphenyl)-2,5-diazabicyclo-[2,2,2] octane.

EXAMPLE 33

*Benzyl-5-(p-methoxyphenyl)2,5-diazabicyclo-[2,2,2] octane-2-carboxylate*

A solution of 0.1 mole of benzyl-5-(p-hydroxyphenyl)-2,5-diazabicyclo-[2,2,2]octane-2-carboxylate in 400 ml. of 1 N sodium hydroxide is treated with 0.11 mole of dimethylsulfate with vigorous stirring. After 2 hours, the product is extracted with ether, washed with water and dried over sodium sulfate. Evaporation of the dried solution and purification of the residue on a column of neutral alumina (500 g.), using a mixture of ether-ethyl acetate as eluent, gives the product, benzyl-5-(p-methoxyphenyl)-2,5-diazabicyclo-[2,2,2]octane-2-carboxylate.

When the procedure of Example 29 is followed on the above product, there is obtained 2-(p-methoxyphenyl)-2,5-diazabicyclo-[2,2,2]octane.

EXAMPLE 34

*Benzyl-5-p-acetamidophenyl-2,5-diazabicyclo-[2,2,2] octane-2-carboxylate*

The procedure of Example 13 is followed using one mole of benzyl-2,5-diazabicyclo-[2,2,2]octane-2-carboxylate and one mole of acetamidoquinone diazide to produce benzyl-5-p-acetamidophenyl-2,5-diazabicyclo-[2,2,2] octane-2-carboxylate.

EXAMPLE 35

*2-p-acetamidophenyl-2,5-diazabicycle-[2,2,2]octane*

The procedure of Example 29 is followed on the product of Example 34 to produce by removing the chlorobenzyloxy group, 2-p-acetamidophenyl-2,5-diazabicyclo-[2,2,2]octane.

EXAMPLE 36

*2-benzoyl-5-(p-dimethylaminophenyl)-2,5-diazabicyclo-[2,2,2]octane*

The procedure of Example 13 is followed using as the starting material the 2-benzoyl-5-(p-aminophenyl)-2,5-diazabicyclo-[2,2,2]octane prepared in Example 30.

When this product is used in the procedure of Example 25, there is obtained 2-(p-dimethylaminophenyl)-2,5-diazabicyclo-[2,2,2]octane.

EXAMPLE 37

*2-benzoyl-5-benzyl-2,5-diazabicyclo-[2,2,2]octane*

The procedure of 14B is followed using 2-benzoyl-2,5- diazabicyclo-[2,2,2]octane and benzyl chloride as the reagents to produce 2-benzoyl-5-benzyl-2,5-diazabicyclo-[2,2,2]octane.

When this product is used in the procedure of Example 25 there is obtained 2-benzyl-2,5-diazabicyclo-[2,2,2]octane.

When this product is used in the procedure of Example 25 there is obtained 2-benzyl-2,5-diazabicyclo-[2,2,2]-octane.

Similarly, when instead of benzyl chloride, there is used 2-benzoyl-2,5-diazabicyclo-[2,2,2]octane and m-xylylbromide in equivalent quantities in the procedure of Example 14B, there is obtained 2-benzoyl-5-m-xylyl-2,5-diazabicyclo-[2,2,2]octane. When this product is used in the procedure of Example 25, the resulting product is 2-m-xylyl-2,5-diazabicyclo-[2,2,2]octane.

EXAMPLE 38

*2-o-methylthiophenyl-2,5-diazabicyclo-[2,2,2]octane*

A mixture of one-tenth mole of the product of Example 1, one-tenth mole of o-methylthioaniline, 500 ml. of nitrobenzene, one-tenth mole of copper powder and 50 g. of sodium carbonate is stirred at 200° C. until reaction is substantially complete. The hot reaction mixture is filtered and the filtrate is cooled. The filtrate is then concentrated under reduced pressure and the residue is dissolved in alcohol and absorbed on a silica gel column. The product is then eluted from the column with successively increasing portions of ether in ether-petroleum ether mixtures and the fractions are thus separated to yield a small amount of the bis-methylthioanilino adipic ester and the monobromo, monomethylthio anilino adipic esters. The mono product thus obtained is then successively put through the procedures of Examples 2, 3, 4, and 5 to yield 2-o-methylthiophenyl-2,5-diazabicyclo-[2,2,2]octane.

When the above procedure is used, substituting an equivalent quantity of o-anisidine for the o-methylthioaniline, there is obtained the corresponding 2-o-methoxyphenyl-2,5-diazabicyclo [2,2,2]octane.

EXAMPLE 39

*2-methyl-5-p-chlorobenzylhydryl-2,5-diazabicyclo-[2,2,2]octane*

The procedure of Example 14B is followed using as the reagents 2-methyl-2,5-diazabicyclo-[2,2,2]octane and p-chlorobenzylhydrylchloride to yield 2-methyl-5-p-chlorobenzylhydryl-2,5-diazabicyclo-[2,2,2]octane.

EXAMPLE 40

*2-m-xylyl-5-p-chlorobenzohydryl-2,5-diazabicyclo-[2,2,2]octane*

The procedure of Example 14B is followed using as the reagents p-chlorobenzohydride and 2-m-xylyl-2,5-diazabicyclo-[2,2,2]octane to yield 2-m-xylyl-5-p-chlorobenzohydryl-2,5-diazabicyclo-[2,2,2]octane.

EXAMPLE 41

*2-methyl-5-[α-(2'-chloro-10'-phenothiazinyl)-propyl]-2,5-diazabicyclo-[2,2,2]octane*

The procedure of Example 14B is followed using as the reagents 2-methyl-2,5-diazabicyclo-[2,2,2]octane and N-(3-chloropropyl)-2-chlorophenothiazine to yield 2-methyl - 5 - [α - (2' - chloro - 10' - phenothiazinyl) - propyl]-2,5-diazabicyclo-[2,2,2]octane.

EXAMPLE 42

*2-β-hydroxyethyl-5-[α-(2'-chloro-10'-phenothiazinyl)-propyl]-2,5-diazabicyclo-[2,2,2]octane*

The procedure of Example 14B is followed using as the reagent 2-β-hydroxyethyl-2,5-diazabicyclo-[2,2,2]octane and N-3-chloropropyl-2-chlorophenothiazine to yield 2 - β - hydroxyethyl - 5 - [α - (2' - chloro - 10' - phenothiazinyl)-propyl]-2,5-diazabicyclo-[2,2,2]octane.

EXAMPLE 43

*2-methyl-5-cyanomethyl-2,5-diazabicyclo-[2,2,2]octane*

The procedure of Example 15 is followed using as the reagent 2-methyl-2,5-diazabicyclo-[2,2,2]octane and chloroacetonitrile to yield 2-methyl-5-cyanomethyl-2,5-diazabicyclo-[2,2,2]octane.

EXAMPLE 44

*2-methyl-5-β-aminoethyl-2,5-diazabicyclo-[2,2,2]octane*

The procedure of Example 18 is followed using in place of the bis-methyl compound the 2-methyl derivative present in Example 43 to yield 2-methyl-5-β-aminoethyl-2,5-diazabicyclo-[2,2,2]octane.

EXAMPLE 45

*2-hydroxyethyl-5-cyanomethyl-2,5-diazabicyclo-[2,2,2]octane*

Seventy-five hundredths ml. of 37% formaldehyde is added to 1.14 gms. sodium bisulfite and the mixture is diluted with water to a volume of 3 ml. This is cooled and added to 1.4 gms. cold 2-β-hydroethyl-2,5-diazabicyclo-[2,2,2]octane. The mixture is allowed to come to room temperature with stirring. A homogeneous solution forms and then a crystalline solid is precipitated. Potassium cyanide (0.72 g.) is dissolved in water to a total of 2 ml. This is then added to the first reaction mixture and the new mixture is heated on the steam bath. It becomes homogeneous at first and then a solid plus an oil precipitate. The mixture is heated 1 hour and then allowed to stand overnight at room temperature. It is then shaken with chloroform and the chloroform layer is removed. The aqueous layer is diluted with some water, saturated with potassium carbonate and then extracted several times with chloroform. The chloroform extracts are combined, dried and evaporated in vacuo to give 1.7 gms. of crude product. Purification is achieved by adsorption on neutral alumin and elution with 80% chloroform-ether mixtures.

EXAMPLE 46

*2-hydroxyethyl-5-β-aminoethyl-2,5-diazabicyclo-(2,2,2)octane*

The procedure of Example 18 is followed using the product of Example 45 in place of the product used therein to yield 2-hydroxyethyl-5-β-aminoethyl-2,5-diazabicyclo-(2,2,2)octane.

EXAMPLE 47

*2-methyl-5-[N-(4-methyl-10-thiaxanthonyl-1)-2-aminoethyl]-2,5-diazabicyclo-[2,2,2]octane*

A mixture of 0.05 mole of 1-chloro-4-methyl-10-thiaxanthone and 0.05 mole of 2-methyl-5-β-aminoethyl-2,5-diazabicyclo-[2,2,2]octane is dissolved in a small volume of pyridine and refluxed under nitrogen until the reaction is substantially complete. The solution is then concentrated under reduced pressure and partitioned between ether and dilute sodium hydroxide. The ether layer is washed with water, dried over potassium carbonate and evaporated to a residue. The residue is chromatographed on 400 g. of neutral alumina using a mixture of ether-benzene as eluent.

EXAMPLE 48

*2-o-methoxyphenyl-5-(3-p-fluorobenzoyl propyl)-2,5-diazabicyclo-[2,2,2]octane*

The procedure of Example 14B is followed using as the reagents 4-chloro-4'-fluorobutyrophenone and 2-o-methoxyphenyl-2,5-diazabicyclo-[2,2,2]octane to produce 2-o-methoxyphenyl-5-(3-p-fluorobenzoyl propyl)-2,5-diazabicyclo-[2,2,2]octane.

EXAMPLE 49

*2-o-methoxyphenyl-5-(4-p-fluorophenyl-4-hydroxybutyl)-2,5-diazabicyclo-[2,2,2]octane*

The product of Example 48 is dissolved in ethanol and hydrogenated over platinum oxide. The catalyst is filtered and the solution is evaporated to dryness to yield 2-o-methoxyphenyl-5-(4-p-fluorophenyl-4-hydroxybutyl) - 2,5-diazabicyclo-[2,2,2]octane.

EXAMPLE 50

*2-nitroso-5-benzoyl-2,5-diazabicyclo-[2,2,2]octane*

An aqueous solution of 2-benzoyl-2,5-diazabicyclo-[2,2,2]octane is treated with an aqueous solution of sodium nitrite at 70–75° C. until the reaction is substantially complete. The mixture is adjusted to acidic to Congo red with 36% aqueous hydrochloric acid. The precipitated product is filtered to give 2-nitroso-5-benzoyl-2,5-diazabicyclo-[2,2,2]octane.

EXAMPLE 51

*2-benzoyl-5-amino-2,5-diazabicyclo-[2,2,2]octane*

The product of Example 50 is dissolved in aqueous acetic acid and an excess of zinc dust is added in small portions. The mixture is then refluxed until reduction is substantially complete. The dust is filtered off and the product is recovered by evaporation of the solvents under reduced pressure to give 2-benzoyl-5-amino-2,5-diazabicyclo-[2,2,2]octane.

EXAMPLE 52

*2-benzoyl-5-benzoylamino-2,5-diazabicyclo-[2,2,2]octane*

The procedure of Example 7 is followed using 2-benzoyl-5-amino-2,5-diazabicyclo-[2,2,2]octane and benzoyl chloride in dry pyridien as the reagents to produce 2-benzoyl-5-benzoylamino-2,5-diazabicyclo-[2,2,2]octane.

EXAMPLE 53

*2-benzyl-5-ethylamino-2,5-diazabicyclo-(2,2,2)octane*

One part of 2-benzoyl-5-acetylamino-2,5-diazabicyclo-(2,2,2)octane, suspended in 25 parts of freshly distilled dry tetrahydrofuran, is added slowly to a stirred suspension of 1 part lithium aluminum hydride in 100 parts tetrahydrofuran. After addition is complete, the mixture is refluxed overnight. It is then cooled and 5 parts water is added dropwise with stirring. The mixture is allowed to come to room temperature over 2 hours, filtered, and the solids washed with ether. The filtrates are combined and taken to dryness in vacuo. (The residue is dissolved in a minimum amount of dry methanol, saturated with dry hydrogen chloride and diluted with excess dry ether. The white solid which precipitates is filtered. After standing overnight, the precipitate is washed with ether and dried in vacuo at room temperature.) The residue is chromatographed on 30 parts of neutral alumina using ether-petroleum ether as eluent.

EXAMPLE 54

*2-benzoyl-5-benzylamino-2,5-diazabicyclo-(2,2,2)octane*

A. A mixture of 0.1 mole of 2-benzoyl-5-amino-2,5-diazabicyclo(2,2,2)octane in 50 ml. ethanol is treated with 0.1 mole of benzaldehyde. The mixture is stirred for several hours and the precipitate filtered and washed with ethanol and dried in a dessicator in vacuo.

The azomethine is hydrogenated in ethyl acetate at room temperature and 40 p.s.i. using Raney nickel catalyst. After filtration of the catalyst and removal of solvent there is obtained a residue of the desired compound of good purity. Further purification may be realized by recrystallization from benzene-Skellysolve B.

B. The compound may be also obtained by hydrogenation of the mixture of amine and aldehyde in situ under the same conditions as in Example A.

EXAMPLE 55

*2-ethylamino-2,5-diazabicyclo-(2,2,2)octane*

A mixture of 2-ethyl-5-benzyl-2,5-diazabicyclo-(2,2,2)octane in ethanol is catalytically reduced using palladium on charcoal at 40 p.s.i. and room temperature. The catalyst is filtered, washed with fresh ethanol and the combined filtrates are taken to dryness in vacuo. The crude residue is purified by distillation in vacuo.

EXAMPLE 56

*2-benzylamino-2,5-diazabicyclo-(2,2,2)octane*

A mixture of 1 part of 2-benzylamino-5-benzoyl-2,5-diazabicyclo-(2,2,2)octane and 20 parts 10% sodium hydroxide is refluxed overnight. The mixture is cooled, saturated with potassium carbonate and extracted with chloroform. The chloroform is dried and taken to dryness in vacuo yielding a residue of 2-benzylamino-2,5-diazabicyclo-(2,2,2)octane.

EXAMPLE 57

*2-phenyl-5-(α-tetrahydropyryl)-2,5-diazabicyclo-[2,2,2]octane*

To a solution of 0.1 mole of 2-phenyl-2,5-diazabicyclo-[2,2,2]octane in 60 ml. of methanol is added 11.2 g. (0.11 mole) of 2-hydroxytetrahydropyran quickly with cooling and stirring. The reaction mixture is kept at room temperature for two hours and then concentrated in vacuo to about one half of its volume. The concentrate is poured into water and extracted with ether. The ether solution is dried over potassium carbonate and evaporated to a residue. The residue is chromatographed on 1 pound of neutral alumina using ether-petroleum ether as the eluent.

The free base (10 g.) is dissolved in 200 ml. hot methanol and mixed with 100 ml. of isopropanol saturated with hydrogen chloride to give the dihydrochloride.

EXAMPLE 58

*2(p-methoxyphenyl)-5-(α-tetrahydropyryl)-2,5-diazabicyclo-[2,2,2]octane*

When an equivalent amount of 2-(p-methoxyphenyl)-2,5-diazabicyclo-[2,2,2]octane is used in place of 2-phenyl-2,5-diazabicyclo-[2,2,2]octane in the procedure of Example 57, there is obtained 2-(p-methoxyphenyl)-5-(α-tetrahydropyryl)-2,5-diazabicyclo-[2,2,2]octane and its dihydrochloride.

EXAMPLE 59

*2-(5-nitro-2-thiazolyl)-5-acetyl-2,5-diazabicyclo-[2,2,2]octane*

A mixture of 0.1 mole of 2-bromo-5-nitrothiazole and 0.12 mole of 2-acetyl-2,5-diazabicyclo-[2,2,2]octane hydrochloride, 25 g. of sodium bicarbonate and 200 ml. of ethanol is stirred and heated under reflux for 1 hour. After cooling, the crude solid is filtered, dissolved in chloroform, washed with water and dried over sodium sulfate. The chloroform solution is evaporated to a residue, which is then recrystallized from aqueous acetic acid or alcohol to yield the product.

EXAMPLE 60

*2-(5-nitro-2-thiazolyl)-2,5-diazabicyclo-[2,2,2]octane*

A solution of 10 g. of 2-(5-nitro-2-thiazolyl)-5-acetyl-2,5-diazabicyclo-[2,2,2]octane in 70 ml. water and 20 ml. conc. sulfuric acid is heated under reflux for 1 hour and filtered. The filtrate is cooled in an ice-bath and neutralized with concentrated ammonium hydroxide to a pH of 8. The solid product separated is filtered, washed with water and recrystallized from ethanol.

EXAMPLE 61

*2-(5-nitro-2-thiazolyl)-5-diethylcarbamyl-2,5-diazabicyclo-[2,2,2]octane*

A solution of 0.05 mole of 2-(5-nitro-2-thiazolyl)-2,5-diazabicyclo-[2,2,2]octane, 0.055 mole of diethylcarbamyl chloride and 0.1 mole of triethylamine in 200 ml. benzene is heated under reflux for 4 hours. The cooled solution is washed with water and dried over sodium sulfate. After evaporation, the residue is chromatographed on a column of 800 g. of silica gel using benzene-Skellesolve B as eluent.

EXAMPLE 62

*N-substituted-2,5-diazabicyclo-[2,2,1]heptanes*

When the product of Example 6 is used in any of the examples, 7 through 58, in equivalent quantities in place of the 2,5-diazabicyclo-[2,2,2]octane, the corresponding 2,5-diazabicyclo-[2,2,1]heptane is obtained.

We claim:

1. A compound of the formula

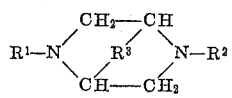

in which $R^1$ and $R^2$ are each selected from the group consisting of hydrogen; carbocyclic aroyl in which the carbocyclic radical has less than three fused six-membered rings; substituted carbocyclic aroyl in which the carbocyclic radical has less than three fused six-membered rings and in which the substituents are selected from the group consisting of lower alkoxy and lower alkanoyloxy; lower alkanoyl; substituted lower alkanoyl in which the substituent is selected from the group consisting of halogen and phenyl; cinnamoyl; monocyclic heteroaroyl in which the heterocyclic ring has less than 7 and more than 4 atoms, there being no more than two heteroatoms in said ring, the said heteroatoms being selected from the group consisting of nitrogen, oxygen and sulfur; nitro substituted monocyclic heteroaroyl in which the heterocyclic ring has less than 7 and more than 4 atoms, there being no more than two heteroatoms in said ring, the said heteroatoms being selected from the group consisting of nitrogen and sulfur; carboxy; substituted carboxy of the formula —COM in which M is selected from the group consisting of phenoxy, nitrophenoxy, lower alkoxy, di(lower alkyl) amino and diphenylamino; lower alkyl; substituted lower alkyl in which the substituent is selected from the group consisting of carb-lower alkoxy, cyano, hydroxy, amino, lower alkanoylamino di(lower alkyl) amino, benzodioxanyl, phenyl, halophenyl, halobenzoyl, chlorophenothiazinoyl; phenyl; substituted phenyl in which the substituent is selected from the group consisting of hydroxy, lower alkanoylamino, amino, di(lower alkyl)amino, lower alkoxy, lower alkyl, lower alkyl mercapto and the group

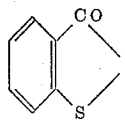

di(lower alkyl) aminophenylsulfonyl; N-morpholinylsulfonyl; N-pyrrolidinyl sulfonyl; phenylthio; lower alkyl substituted phenylthio; nitroso; amino; substituted amino in which the substituent is selected from the group consisting of benzoyl, lower alkyl and benzyl; pyranyl; thiazolyl; and nitrothiazolyl; and $R^3$ is an alkylene bridge of less than three carbons.

2. 2,5-diazabicyclo-[2,2,2]octane.
3. 2,5-diazabicyclo-[2,2,1]heptane.

4. A compound of the formula

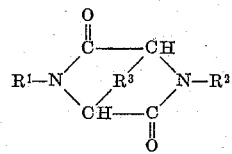

in which $R^1$ and $R^2$ are each selected from the group consisting of hydrogen; carbocyclic aroyl in which the carbocyclic radical has less than three fused six-membered rings; substituted carbocyclic aroyl in which the carbocyclic radical has less than three fused six-membered rings and in which the substitutents are selected from the group consisting of lower alkoxy and lower alkanoyloxy; lower alkanoyl; substituted lower alkanoyl in which the substituent is selected from the group consisting of halogen and phenyl; cinnamoyl; monocyclic heteroaroyl in which the heterocyclic ring has less than 7 and more than 4 atoms, there being no more than two heteroatoms in said ring, the said heteroatoms being selected from the group consisting of nitrogen, oxygen and sulfur; nitro substituted monocyclic heteroaroyl in which the heterocyclic ring has less than 7 and more than 4 atoms, there being no more than two heteroatoms in said ring, the said heteroatoms being selected from the group consisting of nitrogen and sulfur; carboxy; substituted carboxy of the formula —COM in which M is selected from the group consisting of phenoxy, nitrophenoxy, lower alkoxy, di(lower alkyl) amino and diphenylamino; lower alkyl; substituted lower alkyl in which the substituent is selected from the group consisting of carb-lower alkoxy, cyano, hydroxy, amino, lower alkanoylamino di(lower alkyl) amino, benzodioxanyl, phenyl, halophenyl, halobenzoyl, chlorophenothiazinoyl; phenyl; substituted phenyl in which the substituent is selected from the group consisting of hydroxy, lower alkanoylamino, amino, di(lower alkyl)amino, lower alkoxy, lower alkyl, lower alkyl mercapto and the group

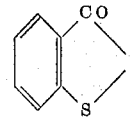

di(lower alkyl) aminophenylsulfonyl; N-morpholinylsulfonyl; N-pyrrolidinyl sulfonyl; phenylthio; lower alkyl substituted phenylthio; nitroso; amino; substituted amino in which the substituent is selected from the group consisting of benzoyl, lower alkyl and benzyl; pyranyl; thiazolyl; and nitrothiazolyl; and $R^3$ is an alkylene bridge of less than three carbons.

5. The compound

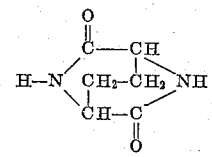

6. The compound

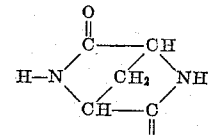

7. A compound of the formula

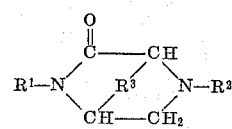

in which $R^1$ and $R^2$ are each selected from the group consisting of hydrogen; carbocylic aroyl in which the carbocyclic radical has less than three fused six-membered rings; substituted carbocyclic aroyl in which the carbocyclic radical has less than three fused six-membered rings and in which the substitutents are selected from the group consisting of lower alkoxy and lower alkanoyloxy; lower alkanoyl; substituted lower alkanoyl in which the substituent is selected from the group consisting of halogen and phenyl; cinnamoyl; monocyclic heteroaroyl in which the heterocyclic ring has less than 7 and more than 4 atoms, there being no more than two heteroatoms in said ring, the said heteroatoms being selected from the group consisting of nitrogen, oxygen and sulfur; nitro substituted monocyclic heteroaroyl in which the heterocyclic ring has less than 7 and more than 4 atoms, there being no more than two heteroatoms in said ring, the said heteroatoms being selected from the group consisting of nitrogen and sulfur; carboxy; substituted carboxy of the formula —COM in which M is selected from the group consisting of phenoxy, nitrophenoxy, lower alkoxy, di(lower alkyl) amino and diphenylamino; lower alkyl; substituted lower alkyl in which the substituent is selected from the group consisting of carb-lower alkoxy, cyano, hydroxy, amino, lower alkanoylamino di(lower alkyl) amino, benzodioxanyl, phenyl, halophenyl, halobenzoyl, chlorophenothiazinoyl; phenyl; substituted phenyl in which the substituent is selected from the group consisting of hydroxy, lower alkanoylamino, amino, di(lower alkyl) amino, lower alkoxy, lower alkyl, lower alkyl mercapto and the group

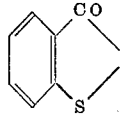

di(lower alkyl) aminophenylsulfonyl; N-morpholinylsulfonyl; N-pyrrolidinyl sulfonyl; phenylthio; lower alkyl substituted phenythio; nitroso; amino; substituted amino in which the substituent is selected from the group consisting of benzoyl, lower alkyl and benzyl; pyranyl; thiazolyl; and nitrothiazolyl; and $R^3$ is an alkylene bridge of less than three carbons.

8. The compound

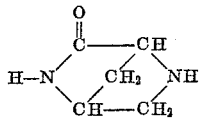

9. The compound

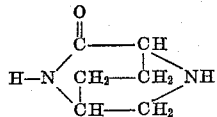

References Cited in the file of this patent
UNITED STATES PATENTS

| | | |
|---|---|---|
| 2,744,086 | Mowry et al. | May 1, 1956 |
| 2,832,784 | Harfenist et al. | Apr. 29, 1958 |
| 2,872,476 | Melkonian et al. | Feb. 3, 1959 |
| 2,905,706 | Sims et al. | Sept. 22, 1959 |
| 3,068,233 | Moss | Dec. 11, 1962 |

OTHER REFERENCES

Barnes et al.: Journal American Chemical Society, vol. 75, pp. 975–977 (1953).

Blackman et al.: Journal Organic Chemistry, vol. 26, pp. 2750–2755 (1961).